United States Patent
Riemann et al.

(10) Patent No.: US 10,532,618 B2
(45) Date of Patent: Jan. 14, 2020

(54) TIRE PRESSURE MONITORING SENSOR

(71) Applicant: WEGMANN automotive GmbH, Veitshöchheim (DE)

(72) Inventors: Andreas Riemann, Veitshöchheim (DE); Bartlomiej Wicher, Würzburg (DE)

(73) Assignee: WEGMANN automotive GmbH, Veitshöchheim (DE)

( * ) Notice: Subject to any disclaimer, the term of this patent is extended or adjusted under 35 U.S.C. 154(b) by 0 days.

(21) Appl. No.: 16/277,728

(22) Filed: Feb. 15, 2019

(65) Prior Publication Data
US 2019/0176545 A1 Jun. 13, 2019

Related U.S. Application Data

(63) Continuation of application No. PCT/EP2017/070901, filed on Aug. 18, 2017.

(30) Foreign Application Priority Data

Aug. 19, 2016 (EP) ..................................... 16185015
Aug. 8, 2017 (EP) ..................................... 17185238

(51) Int. Cl.
*B60C 23/04* (2006.01)

(52) U.S. Cl.
CPC ...... *B60C 23/0471* (2013.01); *B60C 23/0479* (2013.01); *B60C 23/0455* (2013.01)

(58) Field of Classification Search
CPC ............ B60C 23/0471; B60C 23/0455; B60C 23/0479; H04L 63/10; G06F 21/602;
(Continued)

(56) References Cited

U.S. PATENT DOCUMENTS 7,518,495 B2 4/2009 Tang et al.
7,518,792 B2 4/2009 Grill et al.
(Continued)

FOREIGN PATENT DOCUMENTS

CN 102105883 A 6/2011
EP 2821260 1/2015
(Continued)

OTHER PUBLICATIONS

Office Action from the Chinese Patent Office in related application 201780025407.1 (Translation).
(Continued)

*Primary Examiner* — Hoi C Lau
(74) *Attorney, Agent, or Firm* — Yakov S. Sidorin; Quarles & Brady LLP

(57) ABSTRACT

A programming unit for TPMS sensors includes at least a microcontroller and memory storing at least a vehicle group database comprising multiple vehicle groups, each vehicle group comprising at least one vehicle, a version pair database comprising multiple version pair groups, each version pair group representing one vehicle group and comprising at least one version pair wherein each version pair includes an associated application version and an associated sub-application version, an application database comprising multiple application versions, each application version includes an associated binary file, and a sub-application database comprising multiple sub-application versions, each sub-application version includes an associated binary file.

9 Claims, 6 Drawing Sheets

(58) Field of Classification Search
CPC ........ G06F 21/575; G06F 21/57; G06F 8/654;
G06F 11/3672
See application file for complete search history.

(56) References Cited

U.S. PATENT DOCUMENTS

| | | | |
|---|---|---|---|
| 8,692,661 B2 | 4/2014 | Deniau et al. | |
| 8,781,442 B1* | 7/2014 | Link, II | G08G 1/205 |
| | | | 455/411 |
| 10,434,827 B2* | 10/2019 | Tomakidi | G01M 17/013 |
| 2009/0267751 A1 | 10/2009 | Wittliff et al. | |
| 2010/0271191 A1* | 10/2010 | de Graff | B60C 23/0408 |
| | | | 340/447 |
| 2014/0068276 A1* | 3/2014 | Imamoto | G06F 21/602 |
| | | | 713/192 |
| 2014/0200739 A1* | 7/2014 | Kirsch | G07C 5/008 |
| | | | 701/1 |
| 2014/0294180 A1* | 10/2014 | Link, II | G08G 1/205 |
| | | | 380/270 |
| 2015/0015387 A1* | 1/2015 | McIntyre | B60C 23/0471 |
| | | | 340/447 |
| 2015/0202932 A1 | 7/2015 | Kessler et al. | |
| 2016/0253169 A1* | 9/2016 | Fischer | G06F 21/572 |
| | | | 717/168 |
| 2016/0306624 A1* | 10/2016 | Vangelov | G06F 8/654 |
| 2016/0325592 A1* | 11/2016 | Tomakidi | B60C 23/0471 |
| 2017/0097881 A1* | 4/2017 | Hodel | G06F 11/3672 |
| 2017/0103204 A1* | 4/2017 | Mitola, III | G06F 21/57 |
| 2017/0272795 A1* | 9/2017 | Diehl | H04N 21/2541 |
| 2017/0295182 A1* | 10/2017 | Teshler | H04L 63/10 |
| 2019/0012483 A1* | 1/2019 | Thompson | G06F 21/575 |
| 2019/0016342 A1* | 1/2019 | Fredman | B60W 40/09 |
| 2019/0176545 A1* | 6/2019 | Riemann | B60C 23/0479 |

FOREIGN PATENT DOCUMENTS

| | | |
|---|---|---|
| WO | 2015/051982 A1 | 4/2015 |
| WO | 2015/107203 A1 | 7/2015 |
| WO | 2016012627 | 1/2016 |
| WO | 2017202999 | 11/2017 |

OTHER PUBLICATIONS

Translation of First Office Action from the Chinese Patent Office in related application No. 201780025407.1.

* cited by examiner

TIRE PRESSURE MONITORING SENSOR

CROSS-REFERENCE TO RELATED APPLICATIONS

This application is a continuation of pending International Application No. PCT/EP2017/070901 filed on 18 Aug. 2017, which designates the United States and claims priority from European Application No. 16185015.1 filed on 19 Aug. 2016 and European Application No. 17185238.7 filed on 8 Aug. 2017. The disclosure of each of the above-identified applications is incorporated herein by reference.

BACKGROUND

1. Field of the Invention

The invention relates to tire pressure monitoring sensors for vehicles and, in particular, to universal tire pressure monitoring sensors that are configurable to accommodate a variety of vehicles.

2. Description of Relevant Art

A tire-pressure monitoring system (TPMS) is an electronic system configured to monitor the air pressure inside a pneumatic tire on various types of vehicles. A TPMS reports in near real-time tire-pressure information to the vehicle's control system and to the driver. The TPMS discussed below are the so-called direct TPMS, which use sensors (interchangeably referred to as wheel units) mounted inside a tire for measuring the pressure of gases within the tire.

The sensor communicates with the vehicle's control module with the used of wireless signals, which are typically radio frequency (RF) signals. These signals contain the sensor-pressure information and, possibly, other data such as temperature, sensor identification number, or wheel location information. Moreover, an external programming unit may be used to communicate with the sensors (typically with the use of low frequency, LF, radio signals or physical contacts). The inbound communication may be used by a sensor installer to activate the sensor in order to receive the diagnostic information, or to modify the sensor to enable it to operate according to a particular TPM system specification.

The sensors may be installed by vehicle manufacturers as OEM (Original Equipment Manufacturer) products, or the sensors may be installed in installation facilities for replacement or refurbishment purposes as an after-market (AM) solution. The sensors may operate differently in different TPM systems, depending on a vehicle manufacturer, model, year of production, make, and TPMS manufacturer. The differences between TPM systems influence implementation of the sensor, for example: transitioning between different operation modes, triggering conditions for an internal program flow, learning algorithms, timing, wireless signal characteristics, communication protocol, data packet content, etc.

In order for a single sensor to cover most of the after-market (AM) TPM systems, these systems must be supported by the respective AM-TPMS sensor implementation(s). In order to accomplish this goal, one may either employ a multitude of sensor types, each implementing a single TPM system, or employ a universal sensor (which may be either used on all relevant existing vehicles directly, or which may be programmed/configured by an installer to support one or more TPM systems). Understandably, using a multitude of single-system sensor types is not desirable, as it requires the sensor installers to stock a multitude of various sensors. This, in turn, results in a high initial investment for the installer and the supply chain and makes the sensor selection time consuming. A universal sensor seems to be a much more economical solution.

U.S. Pat. No. 7,518,495 B2 discloses a method, systems, and tools for programming sensors with a software program that supports a single TPM system. Here, suitable program software for the sensor is selected from a database. This approach is very flexible because new program implementations may be added later to the database. As the full software has to be loaded to the sensor, the programming times are comparatively long, as a low speed communication interface is used. (Such interface is normally used for transmitting sensor specific data and triggers by the sensor installers.) Furthermore, the intense communication would reduce the capacity of the battery built into the sensor. Alternatively, a wired interface may be used. Such a wired interface requires additional hardware—like drivers and electrical contacts, for example—which make the sensor susceptible to ESD damage and corrosion at the electrical contact points. The handling of a wired interface is more complex, because a cable has to be connected to the sensor prior to the sensor's being programmed and disconnected after the sensor has been programmed.

U.S. Pat. No. 8,692,661 B2 discusses a universal sensor. Here, a plurality of selectable programs, configured to adapt the sensor to specific vehicles, are stored in the sensor during production. The required program is selected from the stored plurality by the sensor installer. Such approach facilitates a very fast programming of the sensor, as the correct program has to be only selected. The drawback of this solution, on the other hand, is that a large number of programs have to be stored in or on the sensor that further requires a large overhead of memory, thereby increasing the sensors costs. Alternatively, the memory-limited microcontroller of the sensor may only be pre-configured for a selection of vehicle models or protocols, which would again require keeping a large number of sensors on stock to provide AM coverage. A further disadvantage stems from the fact that, due to pre-stored on the sensor programs, no adaption to future requirements is possible. Instead, new sensors have to be developed.

US 2015/0202932 A1 discloses a sensor storing a basic version of a program in its memory. For configuration of the sensor in accord to the selected vehicle, the selected vehicle type program parameters are stored in memory. This allows for a comparatively fast programming, as only the parameters have to be transmitted to the sensor. An adaption to future requirements is only possible within the reach of the parameters, and basic new functions cannot be added.

EP 2821260 A1 discusses a method for setting a sensor by deleting the unnecessary encoding procedures. As initially a large number of encoding procedures has to be stored in memory, a comparatively large memory is required (or the memory limitation of commercial micro-controllers forces a number of sensors to be stocked which further increases the costs of the sensor). Finally, adaption of the proposed methodology to new TPM systems is not always possible, unless they fit into an existing TPM system. Otherwise, a new sensor has to be released.

Whenever a new TPM system appears on a market or an existing system is modified or if improvement possibilities or errors are uncovered within existing sensor software, the software must be updated. Some of the above-mentioned prior art relies on an external programming unit, used by the AM installer to perform field updates on a sensor by the means of wired or wireless communication. In US 2015/0202932 A1, for example, the range of field updates is limited by the underlying software system. This may require returning the sensors by the installer back to the producer for updates. In some cases such updates may simply not be possible due to hardware and software limitations, forcing the sensors to be withdrawn. The methodologies of U.S. Pat. No. 8,692,661 B2 and EP 2821260 A1, on the other hand, do not permit any level of software updates, and therefore sensor replacement is always required. This situation is disadvantageous and onerous not only for the installers but also for the entire supply chain as well as the sensor producers themselves. Under the circumstances, introduction of a new version number of the sensor for each software update may also be required, thereby affecting all parties involved in the sensor after market—with extra costs, greater handling complexity, time slips, human errors, and return rates.

The disclosure of U.S. Pat. No. 7,518,495 B2 enables full software field updates, but the required loading times may be long, which makes the discussed solution more prone to communication errors, thereby forcing the installer to repeat the process. The need to repeat the process is, reportedly, a major problem for the installers, as it induces extra costs and delays. Moreover, the intense data transfers may consume extended amount of battery power, thus limiting the sensor lifetime.

The disclosure of the published PCT application WO 2017202999 A1, fully included herein by reference, discusses a TPMS sensor having a bootloader configured to load vehicle specific configuration data.

SUMMARY

The embodiments are providing a universal TPMS sensor (herein also referred to simply as a sensor, for simplicity), which can be adapted (programmed) to a plurality of vehicles, as well as a programming unit configured to adapt the sensor. The programming unit may be a compact handheld device that allows programming in the filed as well as in a tire-workshop. According to the disclosed solution, the TPMS sensor does not become much more complex—and therefore expensive—as compared to standard TPMS sensors. Furthermore, the adaption of the sensor is energy conserving, such that the sensor does not require a larger battery or suffers from reduced lifetime. Finally, the adaption process requires a comparatively short time, such that it could be carried out during a tire-exchange and/or tire-balancing procedure.

The embodiments further provide a TPMS sensor that can be adapted to a specific vehicle, for example by sensor installers in automobile repair shops with the use of a programming unit.

In an embodiment, a TPMS sensor includes at least one environmental sensing component like a pressure, acceleration or temperature sensor indicating at least one parameter indicative of at least one condition of or within the tire, a processing unit configured to execute a program, which may be a microcontroller, a non-volatile memory configured to store at least a program code and/or data, and a sensor communication module which may include a wireless transmitter, a wireless or wired receiver or a wireless or wired transceiver configured to forward information to/from a vehicle and/or a programming unit. The information may include details about the at least one parameter indicative of at least one condition of or within the tire, for example pressure, temperature, rotation direction, the sensor's battery state, or some other information regarding the sensor state. The sensor may have a housing which may be mounted to a tire or a rim such that it is held within a tire mounted to the rim.

The TPMS sensor implements a bootloader that enables loading adaptation data to the sensor. The bootloader is a program code stored in the memory of the sensor. A programming unit may communicate with the bootloader by means of low frequency signals (LF) and high frequency signals (RF) and by using a bootloading protocol for communication. The adaptation data may include program code and/or data of an application (app) and/or a sub-application (sub-app). Herein, an application may include such adaptation data. The term sub-application is used for an application being dependent from an application. The content of the adaptation data loaded to the sensor depends on the versions of the current data stored in the sensor and the target vehicle. The programming unit retrieves the current versions of the adaptation data residing in the sensor and it decides whether and what kind of new adaptation data should be loaded to the sensor. The decision is based on the target vehicle selection which may be made by a user of the programming unit. The user may select the target vehicle by a touchscreen or a keypad. Alternatively, the selection may be made by an electronic reader like a barcode reader or a transponder reader. Next, the adaptation data is loaded to the sensor, thus adapting it to the target vehicle.

The bootloader is a part of the software within the TPMS sensor and may be used for loading a TPMS application and sub-application to the sensor. The purpose of loading the applications is to adapt the sensor to a specific TPM system.

The bootloader may accept low frequency (LF) commands and it replies to them with high frequency (RF) replies. Some of the commands and/or replies may be encrypted. The commands and replies are transmitted according to a bootloading protocol.

The LF commands from the programming unit may include at least one of the following:

Get Challenge: This command initiates bootloading and it starts a new bootloading session. It may be sent at any time.

A magic cookie may be used for integrity checks, because the command data is not dynamic.

The sensor may reply to this command with:
  Challenge: if the command integrity has been preserved. This response may include a challenge packet, which may be used later e.g. for authentication.
  Nothing: on incomplete and/or incorrect command (integrity check failure). Normally, this command is a lacking response (no response), but it may also be a specific response code.

Init App and Init Subapp: These commands contain authentication data. The authentication data may be the challenge received in the reply to the Get Challenge command. The sensor may decrypt the authentication data and if the authentication data are correct, the sensor may erase either an application and/or sub-application flash memory (Init App) or only the sub-application flash memory (Init Subapp), thus preparing the flash memory for receiving consecutive Write commands.

The data integrity and authentication may be controlled by checking the correctness of the authentication data.

The sensor may reply to this command with:
  Status OK: on success of the command
  Status NOK: if an error occurred during execution of the command. An error may e.g. occur, if the flash memory cannot be erased.
  Nothing: on incomplete and/or incorrect command (integrity check failure) or incorrect authentication data.

Write: This command includes a data field which may comprise a 2 byte address followed by a binary field which may comprise application code. The command may further include a 1 byte cookie and a 2 byte command counter.

The Data field may be encrypted (see Data encryption), thus its length may be a multiple of a cipher block size. This implies that the length of the binary field may be equal to 4*n+3, where n is any natural number which may be lower than or equal to 61.

If the binary data line is not aligned to a 4 byte boundary, it should be padded with 0's.

The address may be the physical absolute address within the Flash memory.

The 2 byte command counter may be used for checking, whether the commands arrive in the correct sequence. The counter may be set to 0 for the first Write command within the session and it may be incremented for every consecutive command.

This command may fail with Status NOK due to write failure. In this case, the whole boot loading procedure must be interrupted and repeated from scratch (starting with Get Challenge command). This is because some platforms do not allow writing to Flash more than once after erasing.

The sensor may reply to this command with:

Status OK: on success of the command

Status NOK: if an error occurred during execution of the command. An error may e.g. occur, if the flash memory cannot be erased.

Nothing: on incomplete and/or incorrect command (integrity check failure) or incorrectly encrypted data.

Exit: Upon receiving valid Exit command the bootloader transmits OK and exits to the application.

The sensor may reply to this command with:

Status OK: on success of the command

Status NOK: if an error occurred during execution of the command. An error may e.g. occur, if the flash memory cannot be erased.

Nothing: on incomplete and/or incorrect command (integrity check failure).

A RF reply is sent back from the TPMS sensor to the programming unit as a reaction to the LF commands. Each reply may consist of a single RF PDU (Protocol Data Unit).

The normal reply (except for the challenge packet) is a status packet which may contain only 1 byte data field:

Status OK—the data field is equal to the LF command Func field. This status confirms that a command has been successfully executed.

Status NOK—0. This status indicates critical or security error and it may require the entire boot loading sequence to be repeated (starting from Get Challenge).

The challenge (challenge packet) may be used by the programming unit to derive a device key and an initialization vector (IV). The device key and the initialization vector may then be used by the programming unit to encrypt the challenge and send it back in the Init command. The device key may be unique for each TPMS sensor.

Nothing is a lacking response (no response), but it may also be a specific response code.

The LF commands Init App and Init Subapp and Write may contain encrypted data. Basically, any block cipher may be used for encryption.

For encryption, any error propagating chaining mode may be used, like OMAC, ABC, DCM, PCBC, IACBC, ECBC, XECB, OCM, CWC, CTR/CBC-MAC, CCM, etc. Such a mode assures good message secrecy, since it is a chaining mode. The mode, however, should be designed to propagate even a very little error (single bit) over the entire message. This feature makes it suitable for testing the message integrity and authenticity.

Consequently, selecting the error propagating mode results in eliminating the need for message authentication code (MAC) and checksum (like CRC16), thus shortening the length of the packet and minimizing required code size.

Additional advantage of using chaining error propagating modes for encryption is that it is impossible to spot commonly appearing byte patterns in the encrypted data. A characteristic feature of bytecode is that some byte patterns (strings) appear very often. Either in form of single instructions or a sequence of instructions. For example, an asm instruction to add 2 last values from stack may take 4 bytes of data. Such instruction may appear tens or even hundreds of times in the source code. If the instruction happens to occur in a single encryption block of cipher not using chained mode, its encrypted value will be the same for all the occurrences. This feature may be used by the attacker for observation attacks. In cased of chained mode of operation (like PCBC) the encrypted value is always different, since it depends on previous data in the cleartext.

The PCBC mode requires an initialization vector (IV), which may be calculated by the use of the random number from the Challenge. This assurers that the ciphertext is (almost) always different for the same plaintext. Thus, the ciphertext value is session-specific, which additionally complicates potential protocol attacks.

The role of the programming unit is to adapt the TPMS sensor to a target vehicle selected by a user. In a first step, the programming unit automatically communicates with the sensor to obtain its current software versions. Such a communication may be triggered by a user or by simply approaching the programming unit into proximity of the sensor. Based on that information and on a target vehicle selection the programming unit identifies if and what kind of update is required in order to adapt the sensor to the target vehicle. Next, it executes the adaptation.

The programming unit must support and/or provide several features. A RF receiver compliant with the sensor and its bootloader as well as a LF transmitter compliant with the sensor and its bootloader must be provided for communication with the sensor and its bootloader software. For user communication, human interface (input and output) devices must be provided. These may be at least one of a touch panel, a keyboard, a display, a speaker, a buzzer, a barcode scanner or a camera. Furthermore, an external data interface for regular database updates like a memory card, an Internet connection, etc. may be provided.

The programming unit input/output devices may allow the installer selecting one or more target TPM system, according to which the sensor should operate, for example by manually entering the vehicle identification number (VIN), by reading the VIN using a barcode scanner or a camera or by manually selecting the vehicle producer, make, model, production date, etc. The programming unit input/output devices may also enable inserting version numbers of the apps or inserting other information indicating such version numbers, like sensor serial number, which can be used by the programming unit to find the required version numbers in its memory. The programming unit may also acquire the version numbers directly from the sensor, using the sensor communication module. The programming unit may include an algorithm using the target TPM system selection and the version numbers to automatically detect if in order to configure the sensor to operate according to the target TPM system the sensor requires any of the full field software update, uploading data or no additional action.

The programming unit may include at least one and most preferably all of the following software components:

Vehicle group database (VGDB): The VGDB divides vehicles to groups. Each group implements one TPM system. The vehicle group database contains a number of entries representing vehicle groups. Each entry contains a number of specific vehicle models determined by manufacturer, model, make, date and possibly other factors. The entries may be numbers, but may also be alphanumeric identifiers. The vehicle group database is used by the binary file selector to determine what kind of TPM system (vehicle group) is supported by the target vehicle.

Version pair database (VPDB): The VPDB stores a list of application and sub-application versions supported by the vehicle groups. Each entry in the version pair database represent one vehicle group. The entry contains a number of version pairs (VP), each VP comprising at least exactly one application version (AV) and exactly one sub-application version (SAV). The entries may be numbers, but may also be alphanumeric identifiers. The version pairs are used by the binary file selector to decide whether a sensor requires a full software update, only adaptation or no action at all.

Application database (ADB) and sub-application database (SADB): The Application database (ADB) and sub-application database (SADB) stores S-record (SREC) files containing binaries of available applications and sub-applications. Each SREC consists of a number of records placed in separate lines. A record may have the following structure:

| Field | Content |
|---|---|
| Type | "S1" string |
| Len | 2 hex digits (1 byte): indicating the number of bytes that follow in the rest of the record (Addr + Bin + Chksm) |
| Addr | 4 hex digits (2 bytes): target address of Data in the sensor memory (value of Addr field of the Write command) |
| Bin | Binary data to store on Addr of the sensor (value of Bin field of the Write command) |
| Chksm | 2 hex digits (1 byte): Record checksum (may be ignored) |

The records from the binary files may be transmitted to the sensor with the use of a boot loader protocol (sec_btl-dr_prot). Each record may be transmitted within a single Write command.

There may be a plurality of databases as described above. Alternatively, there may be any number of databases storing tables with the database information. There may be only one database storing four tables including vehicle groups, version pairs, applications and sub-applications. Important is the data structure. It is not relevant, whether the data is stored in one or multiple databases or tables.

Database updater: The VGDB, VPDB, ADB and SADB must be regularly updated in order to accommodate the latest software updates, new vehicles models and TPM systems. The content of the databases will be provided by a supplier to the programming unit producers when necessary. A role of the database updater is to download the latest version of the databases (most likely from an Internet location) and to update the databases locally.

Binary file selector: Depending on the target vehicle and current application and sub-application residing on the sensor, one of the following actions may be required to adapt the sensor to the target vehicle:

Transmit a sub-application only (typical)
Transmit an application and a default sub-application to the sensor (rare)
Nothing: vehicle not supported or sensor already supports the target vehicle (rare)

The selection of the binary file(s) to transmit to the sensor is done by the binary file selector. It may operate according to the algorithm disclosed herein.

Application loader: The application loader implements the transmitter side of the boot loader protocol (sec_btl-dr_prot). Its role is to transmit the binary files (SRECs) to the sensor, as requested by the Binary file selector.

Should an application binary and a default sub-application binary be transmitted to the sensor, the transmission may be performed within a single boot loading session.

Another embodiment relates to a method of programming a TPMS sensor. After starting the process, the programming unit gets at least one of vehicle type, make, and model from a user input device, like a keyboard, touch screen, etc. In a following extraction step, the vehicle group of the target vehicle is extracted from the vehicle group database (VGDB). If no vehicle group is found, an error is displayed, indicating that the selected type/make/model is not supported. Then the method may be terminated or restarted. If a vehicle group is found, at least one version pair is extracted of the vehicle group from the version pair database. Then a Get Challenge command is transmitted to the TPMS sensor and a reply is received. In case of a positive reply, the algorithm is continued, otherwise it is aborted and an error message may be displayed. In a next step, the current sensor application version (AV) and the sub-application version (SAV) are extracted from the reply. In the next step it is checked, whether one of these application versions (AV) exists in one of the version pairs (VP) extracted from the version database (VPDB). If this is not true, the version pair (VP) with the greatest application version (AV) is selected. Then, the binary of the application from application database (ADB) and the sub-application database (SADB) based on the application version (AV) and sub-application version (SAV) from the selected version pair (VP) are obtained. The obtained binary of the application and sub-application are loaded to the sensor. After download, a success message may be displayed. Finally, the algorithm is terminated.

If in the above step of checking whether one of the application versions (AV) exists in one of the version pairs (VP) it is determined that the current sensor application version (AV) exists in one of the version pairs (VP) extracted from the database, then it is checked, whether the sensor current sub-application version (SAV) is equal to a sub-application version (SAV) of one of the version pairs (VP) extracted from the version pair database (VPDB). If this is true, then no modification of the sensor memory is necessary and it is proceeded with a step displaying a success message. If it is not true, then the binary of the sub-application from sub-application database (SADB) based on sub-application version (SAV) from the one of the extracted version pairs (VP) is obtained. This sub-application is loaded to the sensor. After a successful download, a success message may be displayed.

BRIEF DESCRIPTION OF THE DRAWINGS

In the following, embodiments of the invention are described by way of example and without limitation of the general inventive concept in reference to the drawings, of which.

Embodiments of the invention may be variously modified and take alternative forms. Specific embodiments are discussed below based on non-limiting examples. It should be understood, however, that the specific drawings and related portions of the disclosure are not intended to limit the scope of the invention to any particular disclosed form or implementation, but to the contrary are intended to cover all modifications, equivalents and alternatives within the spirit and scope of the invention as defined by the appended claims.

DETAILED DESCRIPTION

Figure 1:
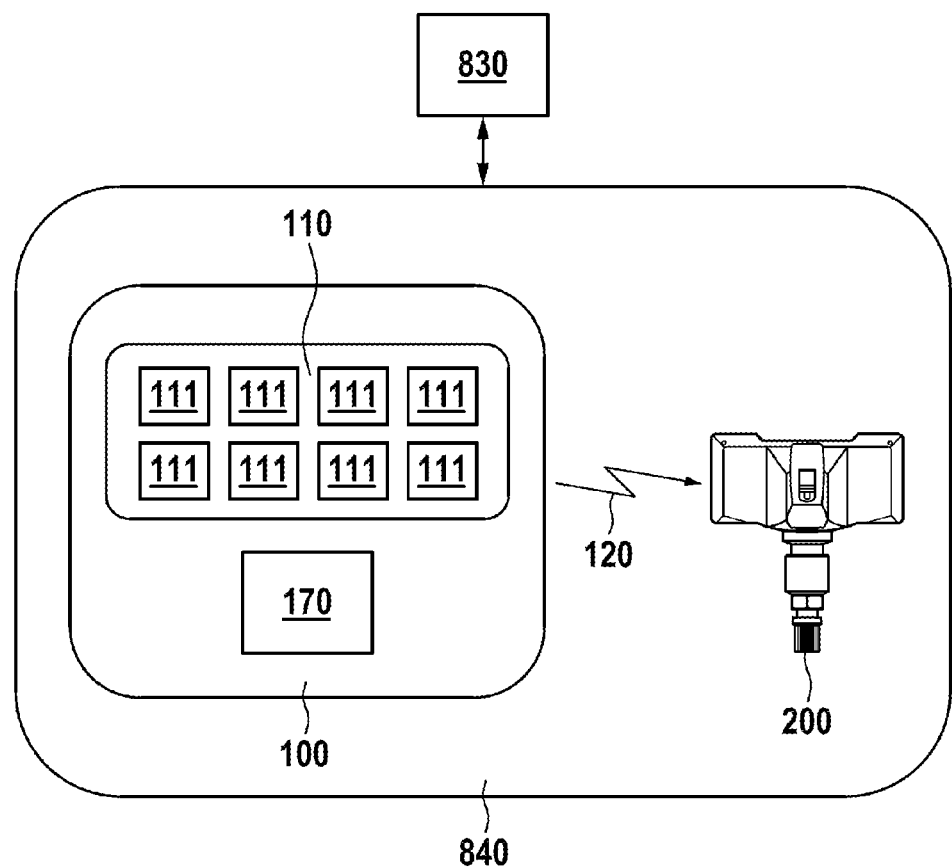
FIG. 1 shows a basic structure and usage of a sensor configuration system.

In FIG. 1 a basic structure and usage of a sensor configuration system 840 is illustrated schematically. A programming unit 100 may have an output device 110 (that may be configured as a display or a printer, for example) and an input device 170 (which may be a touch screen, a keyboard, or a barcode scanner, depending on the embodiment). The output device 110 is configured to provide an installer 830 (that is, a person installing the sensor) with a plurality of options representing, for example, a selection of a target vehicle, within which the sensor 200 has to operate. The installer 830 may communicate his options selection with the input device 170. The programming unit 840 configures the sensor 200, for example via a wireless communication interface 120, to make the sensor 200 operate according to a specific TPM system used by the vehicle that has been selected by the installer 830.

Figure 2:
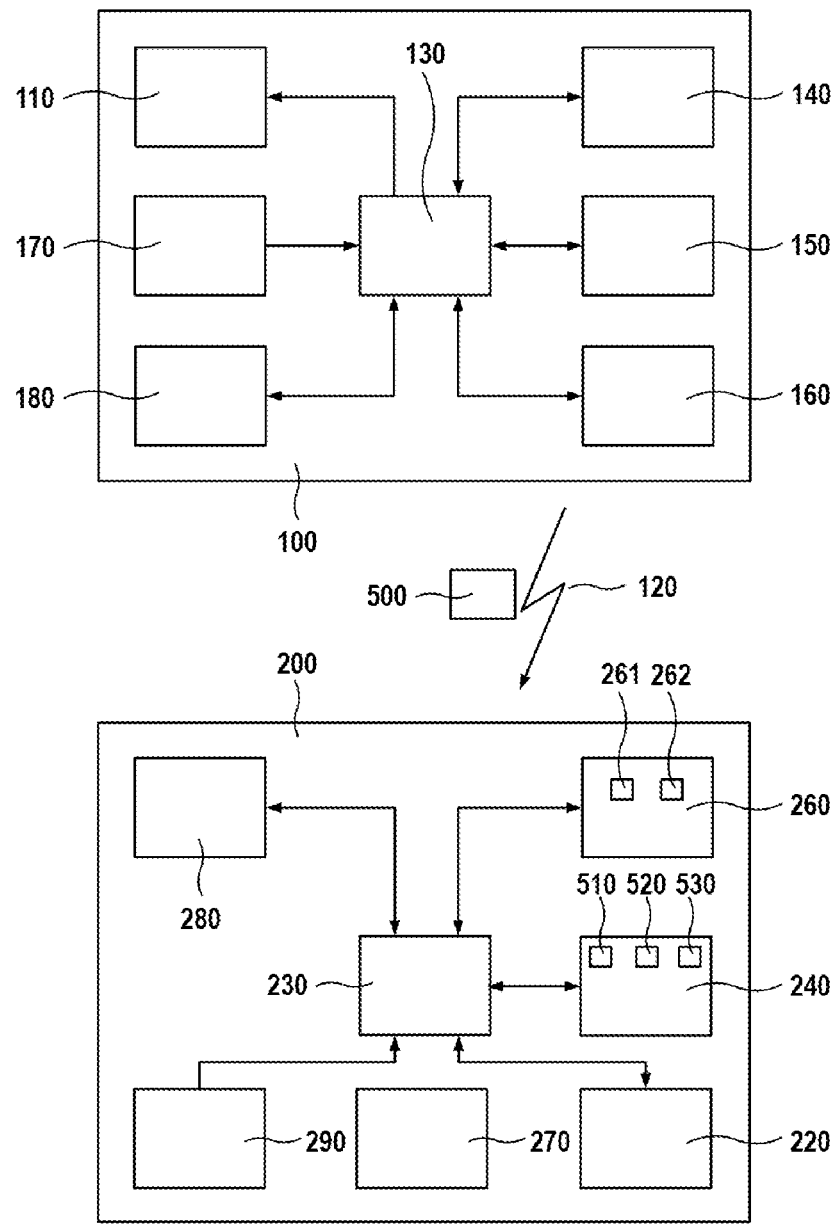
FIG. 2 illustrates details of a sensor configuration system.

In FIG. 2, more details of a sensor configuration system are shown. The programming unit 100 may be equipped with a microcontroller or microprocessor 130, further connected to a tangible, non-volatile memory or storage 140. The memory 140 may be organized as a database and may contain information representing various vehicles and sensors. The memory may be configured as a kind of RAM/ROM, a disk drive, or a network connected storage, for example. The stored on such memory 140 information about vehicles may include at least one of: identifiers of vehicle manufacturers, data representing vehicle models, manufacturing years, vehicle identification number(s), and specific TPMS requirements. The store information about sensors may include at least one of a first application, a first sub-application, a second application, a second sub-application, and some auxiliary data. Furthermore, there may be cross-links between specific vehicle manufacturers, models, years, or individual vehicles and specific apps. There may also be stored information representing sensor hardware and software (such as, for example, manufacturer, model number, manufacturing year, software version numbers, and specific hardware capabilities—for example processing power and memory space). In a related embodiment, the programming unit 100 may contain an application loader software code 180 configured to link the information about the vehicles and sensors and other information stored within the unit's memory, in order to select the appropriate content of communication data 500 to be transferred to the sensor 200 (for example, via the wireless communication 120). The content of the communication data 500 may be further received and used by the sensor 200 to configure itself (to self-configure) to operate with a specific TPM system.

In one embodiment, for communication with and software upload to the sensor 200, a programming unit communication module 160 may be provided. This communication module 160 may be configured as a wireless communication module or as a wired communication module. Although a unique directional communication module is sufficient to upload data to the sensor 200, a bidirectional communication module configured to transmit data to the sensor 200 as well as to receive data from the sensor 200 may also be employed. In the latter case, the data received from the sensor 200 may include information about the sensor (such as, for example, a manufacturer, type, a year of manufacture, software version, and/or serial number). In addition, a checksum or confirmation of the data uploaded to the sensor 200 may be received. The programming unit is shown to include the output device 110 and the input device 170, which may be controlled by the microcontroller or microprocessor 130. The microcontroller/microprocessor 130 may have access to a network interface 150, which, in turn, may be configured to provide a connection to an external computer, an external network, external data storage, and/or to the Internet. Such connection may be used for updating the database 420 (see FIG. 4), downloading and/or updating information about vehicles, sensors, the apps or any software required for handling and/or compiling such information.

A sensor 200 is shown to include a processing unit 230, configured to control the sensor, together with a non-volatile memory 240. The memory 240 may be a flash, EEPROM, ROM memory, or a battery powered RAM. An environmental pressure sensor device 280 may be provided for monitoring the gas pressure within the tire and relaying such gas-pressure information to the processing unit 230. Depending on the specifics of a particular hardware implementation of the sensor 200, there may also be used at least one auxiliary sensor 290 that is configured to measure the sensor environmental conditions (such as acceleration, shock, and/or temperature). For communication with the programming unit 100, at least one sensor communication module 260 may be provided. The module 260 includes at least a wireless transmitter 261 and a wireless or wired receiver 262. This sensor communication module 260 includes a boot loader software code 530 to receive the communication data 500 from the programming unit 100 and store the received data into the memory 240. The communication data 500 may include at least one of a first application 510 and a second application 520. For powering the sensor 200, a battery 270 may be provided.

In one embodiment, the same sensor communication module 260 may be configured to enable communication with a vehicle. Although the communication requirements for high speed and high volume uploading the software from the programming unit 100 and during normal operation like low speed and low volume data communication for those for uploading the software from the unit 100 during the tire-pressure monitoring are significantly different, these requirements may be handled by the same sensor communication module. The minimum requirement for data upload is the receiver 262 in the sensor communication module 260 in order to communicate with the bootloader 530. The minimum requirement for tire-pressure monitoring is the transmitter 261 configured to transmit status information to the vehicle. A low-power transceiver may be used for both of these communication paths. There also may be a high-speed high-power transmitter. Of course, any additional combination of electronic circuitries—such as, for example, a full high-speed transceiver configured for software upload and a full low-power, low-speed transceiver configured for pressure monitoring—may also be provided.

Figure 3:
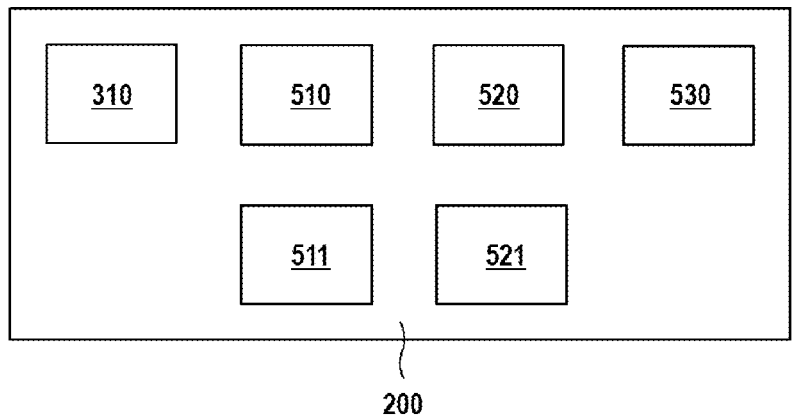
FIG. 3 depicts the logic structure of a sensor.

FIG. 3 shows schematically the logic structure of an embodiment of the sensor 200 of the invention. There may be a system manager 310 configured to perform general system management tasks (such as power management, task scheduling or hardware management for the sensor resources like environmental sensing components, non-volatile memory, communication module, processing unit, etc.), as well as electronic circuitry operating to implement various utility functions (such as, for example, like timers, mathematical operators, memory manipulation, string manipulation, etc.). In one implementation, the system manager is configured to provide access to the functionality(ies) it implements to at least one application or sub-application. The sensor may additionally include at least one of a first application 510, a first sub-application 511, a second application 520, and a second sub-application 521—stored within the non-volatile storage memory 240.

Figure 4:
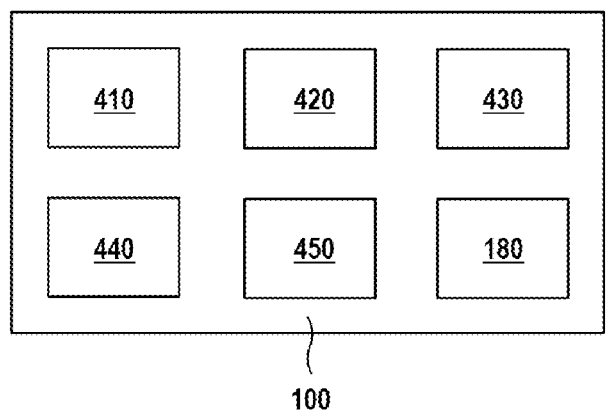
FIG. 4 is a schematic of the logic structure of a programming unit.

FIG. 4 illustrates the logic structure of the programming unit 100. The programming unit 100 has an application loader code 180, configured to upload data to the sensor 200. There may be an upload manager 410, configured to collect the up-loadable data. The upload manager 410 may be configured to be part of the application loader 180. Furthermore, a database 420 may be provided to store information about vehicles and/or sensors and/or for storing related apps. A user interface manager 430, when present, is configured to communicate with the installer 830. There may further be a network manager 440 and a TPMS receiver manager 450.

Figure 5:
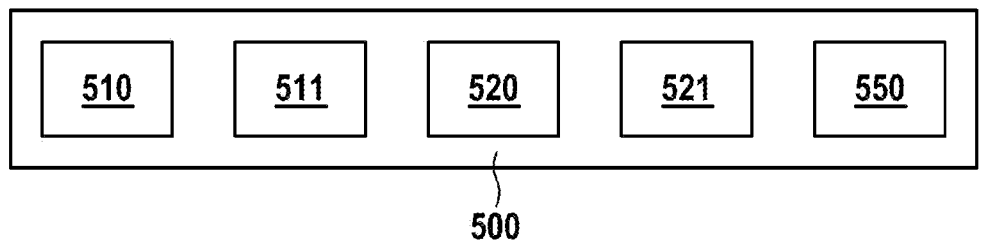
FIG. 5 shows the details of the data transmitted between the sensor and the programming unit.

FIG. 5 shows schematically the content of data transferred between the programming unit 100 and the sensor 200. The data 500 may include at least one of the first application 510, the first sub-application 511, the second application 520, the second sub-application 521, and auxiliary data 550. Depending on the particular implementation, the auxiliary data 550 may contain a sensor identification number, firmware updates, data reception confirmation, protocol handshakes, version numbers of software residing on the sensor, checksums or code used for invoking sensor producer proprietary functionality. What exactly is transmitted within the communication data 500 is decided by the application loader 180 and depends on contents of the sensor memory 240, an immediate moment of sensor lifetime and, possibly, other factors.

Figure 6A:
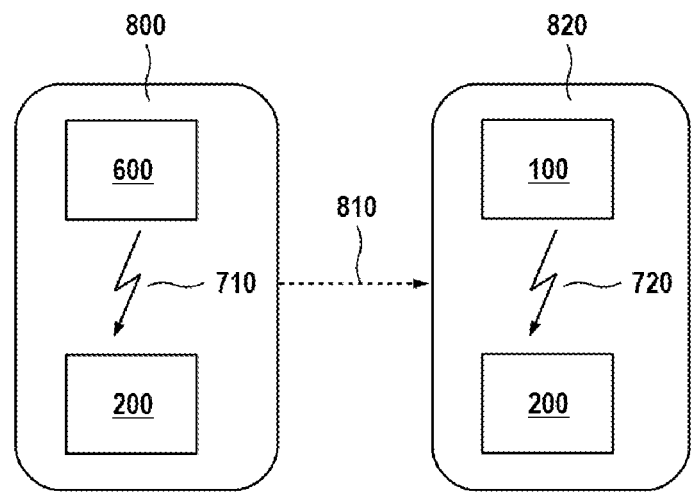
FIG. 6 illustrates the sensor configuration system from the chronological and deployment perspective.
Figure 6B:
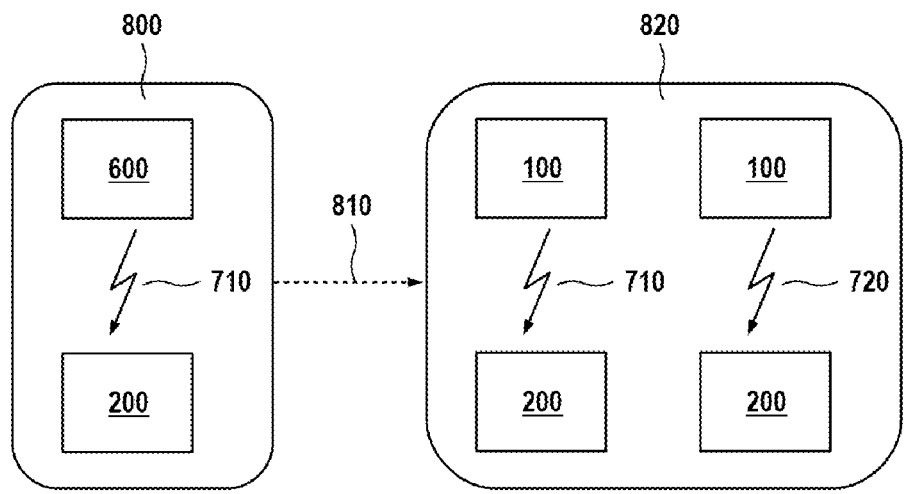

FIGS. 6A and 6B show the sensor configuration system from a chronological and deployment perspective.

FIG. 6A presents the first scenario, where the sensor 200 does not require a full field software update (that comprises updating at least one of the first application 510, the first sub-application 511, the second application 520, the second sub-application 521, and auxiliary data 550 residing in the non-volatile memory 240). Within the production facility 800, at least a bootloader 530 and optional apps are loaded (710) to the sensor's non-volatile memory 240 with the use of a production programming unit 600. The production programming unit 600 may be programmed to handle multiple sensors at a time, and it may use either the communication module 260 of the sensor 200 or the direct access module 220 of the sensor 200 to write to the non-volatile memory. In another embodiment, only the first application 510 may be uploaded to the processing unit 100 with the use of the sensor's direct access module 220 and the second application 521 is uploaded with the use of the sensor's communication module 260. Any other combination is also possible. Next, the sensor 200 is shipped to the installation facility 820 via the supply chain 810. At the destination, the programming unit 100 is used to specify to which target TPM system the sensor 200 should be configured to. The programming unit 100 communicates with the TPMS sensor and it uses the information received from the sensor (such as version numbers of the software stored within the sensor 200) as well as its internal data base 420 to determine that the sensor does not require full field software update. The programming unit determines also, that the sensor requires installing new application(s). Accordingly, only the application code is transferred, 720, to the sensor 200, thereby causing the sensor 200 to be compatible with the required TPM system. The entire communication process is relatively fast, and, reportedly it lasts about 3 seconds when implemented.

FIG. 6B illustrates the second scenario, where the sensor 200 requires the full field software update. Similarly to the process shown in FIG. 6A, the sensor 200 is initialized in the production facility 800 and then it is shipped to the installation facility 820 via the supply chain 810. Similarly, the installer selects the target TPM system on the programming unit 100 and the tool determines whether the full field software update is necessary. If, according to the tool database, the version of the application residing in the sensor memory does not support the target TPM system, a newer version of the application is uploaded to the sensor 200 within the full field software update 710, the newer version supporting the target TPM system. After the upload is completed, the programming unit 100 automatically uploads, 720, to the sensor the required application code in order to make the newly uploaded application configure the sensor 200 to operate according to the target TPM system. The entire communication process is significantly longer than the process presented in FIG. 6A, reportedly it lasts about 30 seconds when implemented. The process presented in FIG. 6A is much more common than the process presented in FIG. 6B, since updating the application is only required when full field software updates are necessary.

Figure 7:
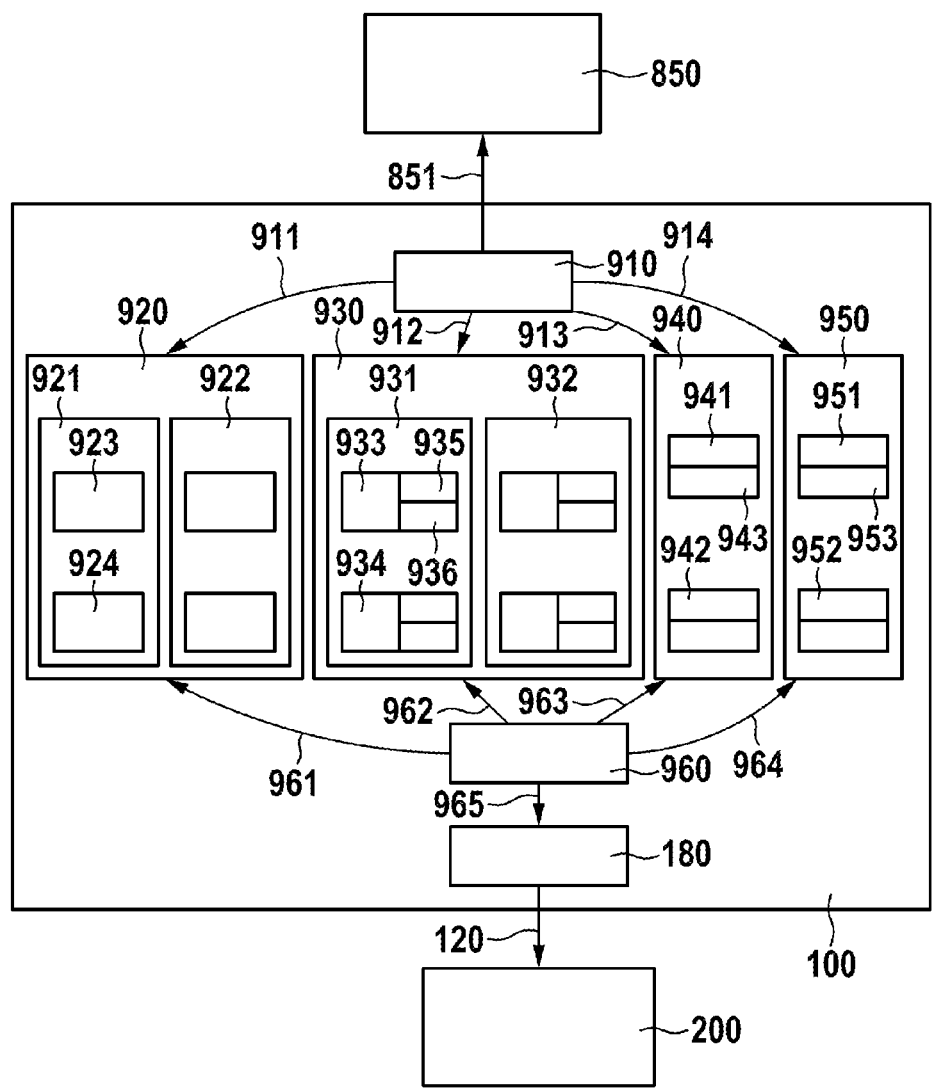
FIG. 7 shows the software components in the programming unit.

In FIG. 7, the software components in the programming unit 100 are shown. The programming unit 100 receives the latest databases and/or latest database updates 851 from an online database 850 and generates therefrom the data that are transmitted by wireless communication 120 to the TPMS sensor 200. The database updates are managed by a database updater 910, which acquires the latest databases from the online database and distributes the obtained data into different databases programming units. Here, the term "database" is used for simplicity and clarity. Of course, instead of using multiple databases, a single database may be used. Instead of using multiple databases, alternatively multiple tables in the same database may be used. The database updater 910 updates, 911, the vehicle group database (VGDB) 920. The vehicle group database may contain a plurality of vehicle groups 921, 922. Each vehicle group may include a plurality of vehicle entries 923, 924. The vehicles within a common vehicle group may use the same TPM system. The individual vehicles may differ in specific parameters.

The database updater 910 further updates 912 the version pair database (VPDB) 930. The version pair database may contain a plurality of groups 931, 932. Each group may include a version pair 933, 934. Each version pair includes exactly one application version (AV) 935 and exactly one sub-application version (SAV) 936.

The database updater 910 further updates 913 an application database (ADB) 940.

A final file selector receives the vehicle group 961 from the vehicle group database 920, receives the vehicle pairs 962 from a version pair database 930, receives a binary 963 from application database 940, and receives a binary 964 from the sub-application database 950. At least the binaries are forwarded, 965, to the application loader 180 that further transmits these binaries to the TPMS sensor 200.

Figure 8:
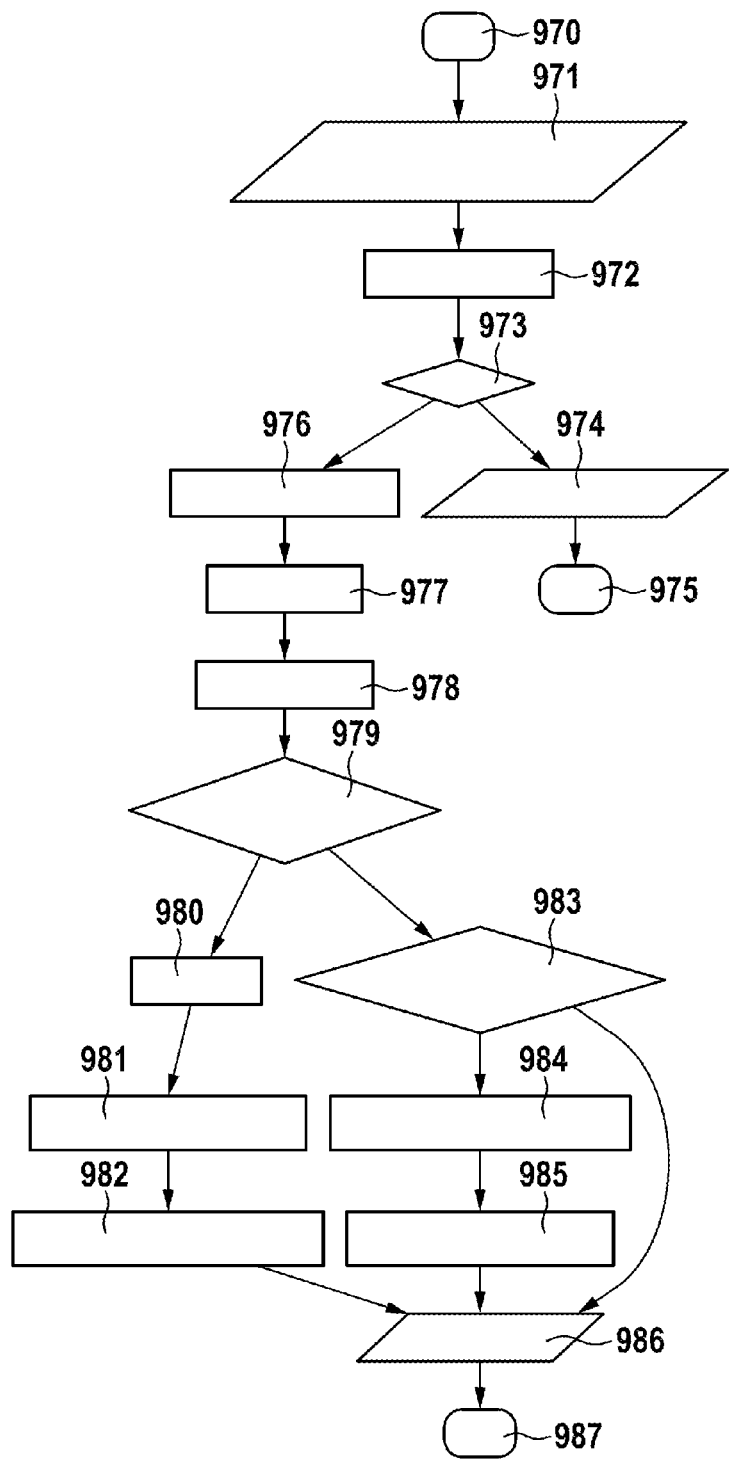
FIG. 8 illustrates a sensor adaptation algorithm.

In FIG. 8, a sensor adaptation algorithm is shown. The algorithm is initiated at the start 970. After the start 970, the programming unit 100 obtains the vehicle type/make/model from the user input device, (such as a keyboard, touch screen, or the like). At an extraction step 972, the vehicle group of the target vehicle is extracted from the vehicle group database (VGDB) 920. If no group is found, 973, an error 974 is generated, indicating that the selected type/make/model is not supported. After the display of the error 974, a further error 975 may be indicated and/or the algorithm is terminated. If a group is found, at least one version pair is extracted, 976, of the vehicle group from the version pair database. Then the Get Challenge command is transmitted to the TPMS sensor and a reply is received. In case of a positive reply, the algorithm is continued, otherwise it is aborted. In a next step, the current sensor application version (AV) and the sub-application version (SAV) are extracted 978 from the reply. In the next step it is checked 979, whether one of these application versions (AV) exists in one of the version pairs (VP) extracted from the version database (VPDB).

If this is not true and one of the AVs does not exist in one of the VPs extracted from the VPDB, then the version pair (VP) with the greatest application version (AV) is selected, 980. Then, the binary version of the application from application database (ADB) and the sub-application database (SADB) based on the application version (AV) and sub-application version (SAV) from the selected version pair (VP) are obtained, 981. The obtained binary of the application and sub-application are loaded, 982, to the sensor. After such download, a success message is displayed, 986. Finally, the algorithm is terminated, 987.

If in step 979 it is determined that the current sensor application version (AV) does exist in one of the version pairs (VP) extracted from the database, then it is checked, at 983, whether the sensor current sub-application version (SAV) is equal to a sub-application version (SAV) of one of the version pairs (VP) extracted from the version pair database (VPDB). If this is true, then no modification of the sensor memory is necessary and is the flow proceeds with step 986 displaying a success message. If it is not true, however, then the binary of the sub-application from sub-application database (SADB) based on sub-application version (SAV) from the one of the extracted version pairs (VP) is obtained, 984. This sub-application is loaded, at 985, to the sensor. After a successful download, a success message is displayed, 986.

It will be appreciated by those skilled in the art having the benefit of this disclosure that this invention provides embodiments of tire pressure monitoring sensors for vehicles. Modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

100 programming unit/electronic circuitry
110 output device
111 program options display
120 wireless communication
130 microcontroller/microprocessor
140 memory
150 network interface
160 programming unit communication module
170 input device
180 application loader code
200 sensor
220 direct access module
230 processing unit
240 non-volatile memory
260 sensor communication module
261 wireless transmitter
262 wireless or wired receiver
270 battery
280 environmental pressure sensor
290 auxiliary sensor
310 system manager
410 upload manager
420 database
430 user interface manager
440 network manager
450 receiver manager
500 communication data
510 first application
511 first sub-application
520 second application
521 second sub-application
530 bootloader code
550 auxiliary data
600 production programming unit/electronic circuitry
710 full field software update
720 uploading the configuration code
800 production facility
810 supply chain
820 installation facility
830 installer
840 Sensor configuration system
850 online database
851 get latest databases
910 database updater
911 update of VGDB
912 update of VPDB
913 update of ADB
914 update
920 vehicle group database (VGDB)
921 first vehicle group
922 n-th vehicle group
923 vehicle 1
924 vehicle n 930 version pair database (VPDB)
931 first group
932 n-th group
933 first version pair
934 n-th version pair
935 application version
936 sub-application version
940 application database (ADB)
941 application version 1
942 application version n
943 binary
950 sub-application database (SADB)
951 sub-application version 1
952 sub-application version n
953 binary
960 binary file selector
961 get vehicle group
962 get vehicle pairs
963 get binary
964 get binary
965 request binary transmission
970 start
971 receive vehicle target type/make/model from the user input (device)
972 extract the vehicle group of the target vehicle from VGDB
973 group found?
974 display error: not supported
975 error
976 extract VPs of the group from VPDB
977 transmission Get Challenge and get the reply
978 extract sensor current AV and SAV from the reply
979 sensor current AV exists in one of the VPs extracted from DB?
980 select the VP with the greatest AV
981 get the binary of the application from ADB and of the sub-application from SADB based on AV and SAV from the selected VP
982 load the binary of the application and sub-application (as default sub-app) to the sensor with the use of the bootloading protocol.
983 sensor current SAV equal to SAV of the one of the VPs extracted from VPDB?
984 get the binary of the sub-application from SADB based on SAV from the one of the extracted VPs
985 loading the sub-application to the sensor with the use of the bootloading protocol
986 displaying success
987 success/termination

The invention claimed is:

1. A programming unit for TPMS sensors, the programming unit comprising:
at least one of a microcontroller and a microprocessor, and non-volatile tangible memory storing at least one database, the memory comprising:
a vehicle group database that includes multiple vehicle groups, each vehicle group comprising a description of at least one vehicle;
a version pair database that includes multiple version pair groups, each version pair group representing one vehicle group and comprising at least one version pair, wherein each version pair comprises an associated application version and an associated sub-application version;
an application database that includes multiple application versions, each application version comprising an associated binary file;
a sub-application database comprising multiple sub-application versions, each sub-application version comprising an associated binary file.

2. The programming unit according to claim 1, wherein the programming unit further comprises a binary file selector configured to select at least one of a binary file for an application version and a binary file for a sub-application version based on a selected vehicle.

3. The programming unit according to claim 2, wherein the binary file selector is configured to select the binary file for the application version when a target TPMS sensor does not store, in operation, said binary file for the application version in the non-volatile tangible memory.

4. The programming unit according to claim 2, wherein the binary file selector is configured to select the binary file for the sub-application when a target TPMS sensor does not store, in operation, said binary file for the sub-application version in said non-volatile tangible memory.

5. The programming unit according to claim 1, wherein the programming unit comprises an application loader configured to request, from a TPMS sensor, at least one of an application version and an sub-application version of binary files stored in the non-volatile tangible memory.

6. A TPMS sensor configuration system comprising:
a programming unit according to claim 1, and
a tire-pressure monitoring sensor including at least a processing unit and a non-volatile memory storage, the non-volatile memory storage having executable code thereon, wherein the executable code comprises at least a bootloader configured to load at least one of an application version of a binary file and a sub-application version of the binary file into the non-volatile memory storage.

7. The TPMS sensor configuration system according to claim 6, wherein
the bootloader is configured to forward said at least one of the application version of the binary file and the sub-application version of the binary file stored in the non-volatile tangible memory to the non-volatile memory storage.

8. A method for configuring a tire-pressure monitoring sensor with a programming unit, the method comprising the following steps performed in the programming unit:
a) receiving at least one of a make and a model of a target vehicle from an input device,
b) extracting a vehicle group of the target vehicle from a vehicle group database,
c) if no vehicle group is found, displaying an error message and terminating the method,
d) extracting version pairs of the vehicle group from a version pair database,
e) transmitting a GET CHALLENGE command to the tire-pressure monitoring sensor and acquiring a reply from the tire-pressure monitoring sensor,
f) extracting from the reply a current application version and a current sub-application version in the tire-pressure monitoring sensor,
g) if the current application version exists in a version pair extracted in step d), proceeding with step k),
h) select a version pair, from the version pairs extracted in step d), that has the greatest application version from the extracted version pairs, and obtaining at least one of an associated application version and an associated sub-application version, i) getting at least one of a binary version of an application from an application database and a binary version of a sub-application from a sub-application database based on said at least one of the application version and sub-application version, j) loading at least one of the binary version of the application from the application database and the binary version of the sub-application from the sub-application database to the tire pressure monitoring sensor and proceeding with step n), k) if the current sub-application version exists in a version pair extracted in step d), displaying a success message, l) getting the binary version of the sub-application from the sub-application database based on the sub-application version of one of the version pairs, and m) loading the binary version of the sub-application to the tire-pressure monitoring sensor.

9. The method according to claim 8, further comprising displaying a success message.

\* \* \* \* \*